(12) United States Patent
Fell (10) Patent No.: US 8,838,929 B2
(45) Date of Patent: Sep. 16, 2014

(54) ALLOCATION AND DEALLOCATION OF BOUNDED TIME RELATIVE PORTIONS OF A GRAPHICS MEMORY

(75) Inventor: Robin Fell, Cambridge (GB)

(73) Assignee: ARM Limited, Cambridge (GB)

( * ) Notice: Subject to any disclaimer, the term of this patent is extended or adjusted under 35 U.S.C. 154(b) by 315 days.

(21) Appl. No.: 13/200,949

(22) Filed: Oct. 5, 2011

(65) Prior Publication Data

US 2013/0088501 A1   Apr. 11, 2013

(51) Int. Cl.
*G06F 12/02* (2006.01)

(52) U.S. Cl.
CPC .......... *G06F 12/023* (2013.01); *G06F 12/0253* (2013.01)
USPC .......................................... 711/170; 711/173

(58) Field of Classification Search
CPC .............. G06F 12/023; G06F 12/0253; G06F 12/0261; G06F 12/0269; G06F 12/0276
See application file for complete search history.

(56) References Cited

U.S. PATENT DOCUMENTS

| | | | | |
|---|---|---|---|---|
| 5,978,893 A * | 11/1999 | Bakshi et al. | .................. | 711/171 |
| 6,701,420 B1 * | 3/2004 | Hamilton et al. | ............. | 711/170 |
| 6,831,652 B1 * | 12/2004 | Orr | ................................ | 345/543 |
| 7,065,630 B1 * | 6/2006 | Ledebohm et al. | ............ | 711/206 |
| 7,310,718 B1 * | 12/2007 | Liang et al. | .................... | 711/170 |
| 2003/0120885 A1 * | 6/2003 | Bonola | ........................... | 711/170 |
| 2004/0160449 A1 * | 8/2004 | Gossalia et al. | .............. | 345/543 |
| 2005/0132374 A1 * | 6/2005 | Flood et al. | ................... | 718/100 |
| 2005/0144410 A1 * | 6/2005 | Swafford et al. | ............. | 711/170 |
| 2005/0273567 A1 * | 12/2005 | Blandy | .......................... | 711/170 |
| 2005/0278497 A1 * | 12/2005 | Pliss et al. | ...................... | 711/170 |
| 2007/0271408 A1 * | 11/2007 | Nishimura et al. | ............... | 711/4 |
| 2011/0219204 A1 * | 9/2011 | Caspole | ......................... | 711/173 |

OTHER PUBLICATIONS

Sánchez, Jordi et al., "A Constant-Time Region-Based Memory Allocator for Embedded Systems with Unpredictable Length Array Generation", Sep. 13-16, 2010, IEEE, 2010 IEEE Conference on Emerging Technologies and Factory Automation (ETFA), pp. 1-7.*
Hanson, David R., "Fast Allocation and Deallocation of Memory Based on Object Lifetimes", Software—Practice and Experience, vol. 20(1):5-12, Jan. 1990.*
"Garbage Collection, The Memory Management Glossary" http://www.memorymanagement.org/glossary/g, 5 pages, Retrieved on Nov. 12, 2013.
"Zone memory" http://doom.wikia.com/wiki/Zone_memory, 1 page, Retrieved on Nov. 12, 2013.

* cited by examiner

*Primary Examiner* — April Y Blair
*Assistant Examiner* — Michael C Kolb
(74) *Attorney, Agent, or Firm* — Nixon & Vanderhye P.C.

(57) ABSTRACT

A method of allocating regions of memory including the steps of allocating a corresponding plurality of portions of memory for use by the process and marking regions of memory that are allocated with markers. A start of a region is marked with one of the markers and an end of a region is marked with a further one of the markers, the further one of the markers having a later relative time indication and marking a next allocated region. In response to determining that a region of allocated memory bounded by two of the markers is no longer required by the process, deleting an older of the two markers; and in response to detecting deletion of an oldest one of the markers, deallocating the region of memory up to a new oldest pending marker.

26 Claims, 7 Drawing Sheets

ALLOCATION AND DEALLOCATION OF BOUNDED TIME RELATIVE PORTIONS OF A GRAPHICS MEMORY

BACKGROUND OF THE INVENTION

1. Field of the Invention

The field of the invention relates to data processing apparatus and in particular to the allocation of memory for use by processes executing on the processing apparatus.

2. Description of the Prior Art

Data processing apparatus use data storage to store the code executing on the processing apparatus and the data being processed. At least some of this data storage will be in the form of a memory and different portions of the memory will be allocated for different purposes. Some of this allocation may be a permanent allocation so that that portion of the memory is configured to store data for a particular purpose, while other memory allocations will be temporary. This allows flexibility in the use of memory, so that while a particular process requires storage it can have memory allocated to it, and it when it no longer has this requirement the memory portion may be deallocated making it available for allocation to other processes.

In order to control the allocation of the memory particularly for applications running on the processing apparatus whose requirements change, there have been various techniques devised to allocate portions of memory as they are required and deallocate them when they are no longer required. These known allocation techniques typically use some form of control structure associated with the allocation that determines the location or size of the portion of memory allocated. These control structures may be in the form of tables, linked lists or headers stored before the allocated area. Deallocation updates the control structures. These structures are expensive to store and maintain especially on an embedded device.

It would be desirable to provide allocation and deallocation techniques for memory used by a data processing with reduced storage and updating overheads.

SUMMARY OF THE INVENTION

A first aspect of the present invention provides a method of allocating regions of memory for use by a process comprising the steps of in response to a plurality of requests for data storage from a process, allocating a corresponding plurality of portions of memory for use by said process; marking regions of memory that are allocated with markers, said markers indicating a location of a boundary of an allocated region of memory and a relative time said marker was set with respect to other markers, wherein a start of a region is marked with one of said markers and an end of a region is marked with a further one of said markers, said further one of said markers having a later relative time indication than said one of said markers indicating that it is a more recently set marker, and a next allocated region is marked by said further one of said markers and a yet further one of said markers, said yet further one of said markers having a yet later relative time indication; and in response to determining that a region of allocated memory bounded by two of said markers is no longer required by said process, deleting an older of said two markers; in response to detecting deletion of an oldest one of said markers, deallocating said region of memory up to a next oldest currently pending marker.

The present invention recognises that memory allocation can be a complex task, with significant overhead associated with determining storage requirements, allocating these requirements and storing an indication of the portions that are allocated and also in determining when different portions of the memory are no longer required and deallocating them. This is addressed by the current invention by the use of markers. The memory is allocated in portions, and markers are used to mark regions of memory, which include one or more portions. These markers have an indication of the time they are set associated with them. As data is processed and no longer required, regions of the memory storing this data that is no longer needed can then safely be deallocated. This can be indicated in a simple manner that requires very little management or information storage by simply deleting the markers bounding the region. If the system only allows deallocation of memory when an oldest marker is deleted, no complicated storage mechanism for storing currently allocated and deallocated portions of memory needs to be performed. The system can simply operate on the assumption that the memory allocated after the oldest marker is allocated and that before it is not allocated. Thus, not only is the management of the memory itself simplified, but the burden on any software using the scheme is also low.

In some embodiments, each of said regions comprise at least one of said plurality of portions.

Although generally each of the regions comprise at least one of the plurality of portions, in some rare cases there may be a "zero" portion that separates markers. For example graphics applications are usually required to signal the end of one frame (and thus the start of another). Sometimes these applications choose not to draw anything within a frame (to achieve a special effect, or erroneously). If the allocator is robust in these situations (by choice of an implementation which naturally tolerates these events without special handling internally) then the user of the allocator need not avoid the situation and can thus also avoid the overheads associated with avoiding this case.

In some embodiments an end of said region marked by said further marker abuts a non-allocated region of memory when said further marker is set.

It is convenient if the memory is allocated in a sequential fashion such that further markers indicating the end of the last region to have been allocated abut non-allocated regions of memory. If this is the case there is no need to store additional information about where memory that is available for allocation can be found, one simply needs to store the marker and this information can be derived from this.

In some embodiments said steps of allocating and deallocating memory treat said memory as being subdivided into a plurality of blocks, at least some of said plurality of blocks that have portions allocated to said process being arranged in a logical sequential series such that memory regions are allocated within said blocks in an order of said sequential series, a region being allocated in a first block before a region is allocated in a second block, and wherein in response to all of a memory region within a block being deallocated said block is logically removed from said series such that on further allocation by said allocation step said block can be arranged logically at an end of said sequential series of blocks.

A particularly convenient way of allocating the memory is to treat the memory to be allocated as being formed of blocks, the blocks being arranged in a sequential series once allocated or partially allocated. When a whole block at the start of the sequential series is deallocated it is then available for allocation and when it is allocated for use by the process it will then be at the end of the sequential series. Blocks that are available for allocation and are not yet allocated may be treated as being part of the sequential series, or they may be treated as being within an available set of blocks and only join the sequential series when they have had at least a portion of them allocated. The available set of blocks may be arranged in an order where the most recently used deallocated block is allocated next. The use of the sequential series in conjunction with the markers for blocks where at least some of their storage is allocated enables the deallocation of blocks to be performed once a whole of a block at a start of the series is deallocated.

In some embodiments said memory is memory within a data processing apparatus, said data processing apparatus further comprising a processor and wherein allocation of said memory within said data processing apparatus is controlled by a kernel of an operating system executing on said processor, said method further comprising a step of: requesting at least one block of memory to be available for allocation to said process, a size of said block of memory requested being equal to a multiple of a maximum size of one of said plurality of portions requested by said process; and wherein said steps of allocating said plurality of portions of said memory comprising allocating portions within said at least one block.

In some embodiments the blocks are requested to be available for allocation to the process from the kernel. They may be requested individually or several may be requested together. The requesting of blocks individually may occur where the system does not know the total resource requirements of the process and thus, rather than requesting too much memory to be allocated it is requested block by block as required. If the system knows the maximum size of the portions of memory, that is the amount of memory that is individually allocated to the process in any one allocation step then the blocks are advantageously selected to be this size or a multiple of this size. During allocation a portion is allocated to a single block, thus, if there is not room for a portion in a partially used block then the portion is allocated in the next block. This being the case it is clearly advantageous if the maximum sized portion can fit within a block. Furthermore, there may be an advantage to making the block size some multiple of the individual allocation as this may reduce the total number of requests to the kernel, and thereby save time. The multiple should however, be chosen with care to avoid excessive memory consumption. A suitable multiple may change over time and it may be advantageous to adjust this value based on past behaviour.

In some embodiments said memory is memory within a data processing apparatus, said data processing apparatus further comprising a processor and wherein allocation of said memory within said data processing apparatus is controlled by a kernel of an operating system executing on said processor, said method further comprising a step of: requesting at least one block of memory to be available for allocation to said process; and in response to said process requesting data storage that is larger than said at least one block requesting a further block of memory that is large enough for said data storage and allocating said further block of memory to said process.

If it is not known in advance the maximum size of a portion, then it may be that the size of blocks requested are not sufficient to accommodate the maximum sized portion. If this is the case, then a request for such an allocation from the process will trigger a request to the kernel of this sized block.

In some embodiments said memory is memory within a data processing apparatus, said data processing apparatus further comprising a processor and wherein allocation of said memory within said data processing apparatus is controlled by a kernel of an operating system executing on said processor, said method comprising a further step of: said process requesting from said kernel an area of memory for allocation by said process; said steps of allocating said plurality of portions of said memory comprising allocating portions within said area.

In some embodiments the memory allocation is centrally controlled by a kernel of an operating system and an area of memory is first requested from the kernel and this is then available for allocation to the process as the process requests memory.

In some embodiments said method comprises a further step of: in response to at least one region of said memory being deallocated indicating to said kernel that said at least one region is available to the kernel for allocation.

It may be that as the regions are deallocated by deletion of the oldest marker, then they are given back to the kernel, that is the process indicates to the kernel that these portions of memory are no longer used by it. Alternatively, they may remain available for the process to use and allocate further portions within as required. It should be noted that the steps of requesting memory area from and giving the memory area back to the kernel, require processing resources and as such it may be advantageous for the process to allocate portions and deallocate portions itself and not give them back to the central pool controlled by the kernel. This may particularly be the case where sets of data are continually being requested and going out of date.

In some embodiments said process comprises a software process executing on said processor and said allocation steps are performed by said software process.

This technique is particularly suitable for use with a software process such as an application running on a processor, however, it could also be used when allocating memory for use by an operating system, for example for portions of the operating system that are not always active, such as the device drivers. Thus, as and when they are required a portion of memory, can be allocated for them.

In some embodiments said process comprises a process that periodically processes one of a plurality of sets of input data to generate a corresponding plurality of sets of resultant data, said markers being placed to delimit regions of said memory storing said sets of input data currently being processed, and said step of deleting an older of two markers bounding a region being performed in response to said process generating a set of resultant data from a corresponding set of input data stored within said region.

Embodiments of the present invention are particularly suitable for use with processes that periodically use sets of data. In such a system then memory is required for the storage of data but this data periodically goes out of date. Furthermore, it is known that the set will go out of date together. Thus if the size of a region is selected depending on the size of the data set, then as this set goes out of date the memory regions storing it can be simply deallocated by deleting a marker bounding this region.

There are many processes where sets of data are processed together and are not required at a same time. For example in the case that said process comprises a graphics process and each set of resultant data comprises data for displaying a frame, said step of deleting said marker being performed following rendering of said input data to generate said resultant data.

It should be noted that the resultant data may be pixel data for display or it may be intermediate graphics data for example data indicating vertices of the shapes to be displayed, that is used to generate the display.

A second aspect of the present invention provides a computer program which when executed by a processor controls said processor to perform a method according to a first aspect of the present invention.

A third aspect of the present invention provides a data processing apparatus comprising: a processor for processing data; a memory for storing data processed by said processor; a memory allocator for allocating and deallocating regions of memory for use by a process being performed by said processor; and a storage region for storing markers, each marker comprising an indication of a location of a boundary of an allocated region of memory and an indication of a relative time said marker was set with respect to other markers; wherein said memory allocator is configured in response to requests for data storage from said process: to allocate portions of memory for use by said process; and to mark regions of said memory as they are allocated to said process by setting said markers; wherein a start of a region is marked with an earlier marker and an end of a region is marked with a further marker, said further marker having a later relative time indication than said earlier marker indicating that it is a more recently set marker, a next allocated region being marked by said further marker and a yet further marker, said yet further marker having a yet later relative time indication; and said memory allocator is configured in response to determining that a region of allocated memory bounded by two of said markers is no longer required by said process to delete an older of said two markers and when deleting an oldest of said markers to deallocate said region of memory up to a new oldest pending marker.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
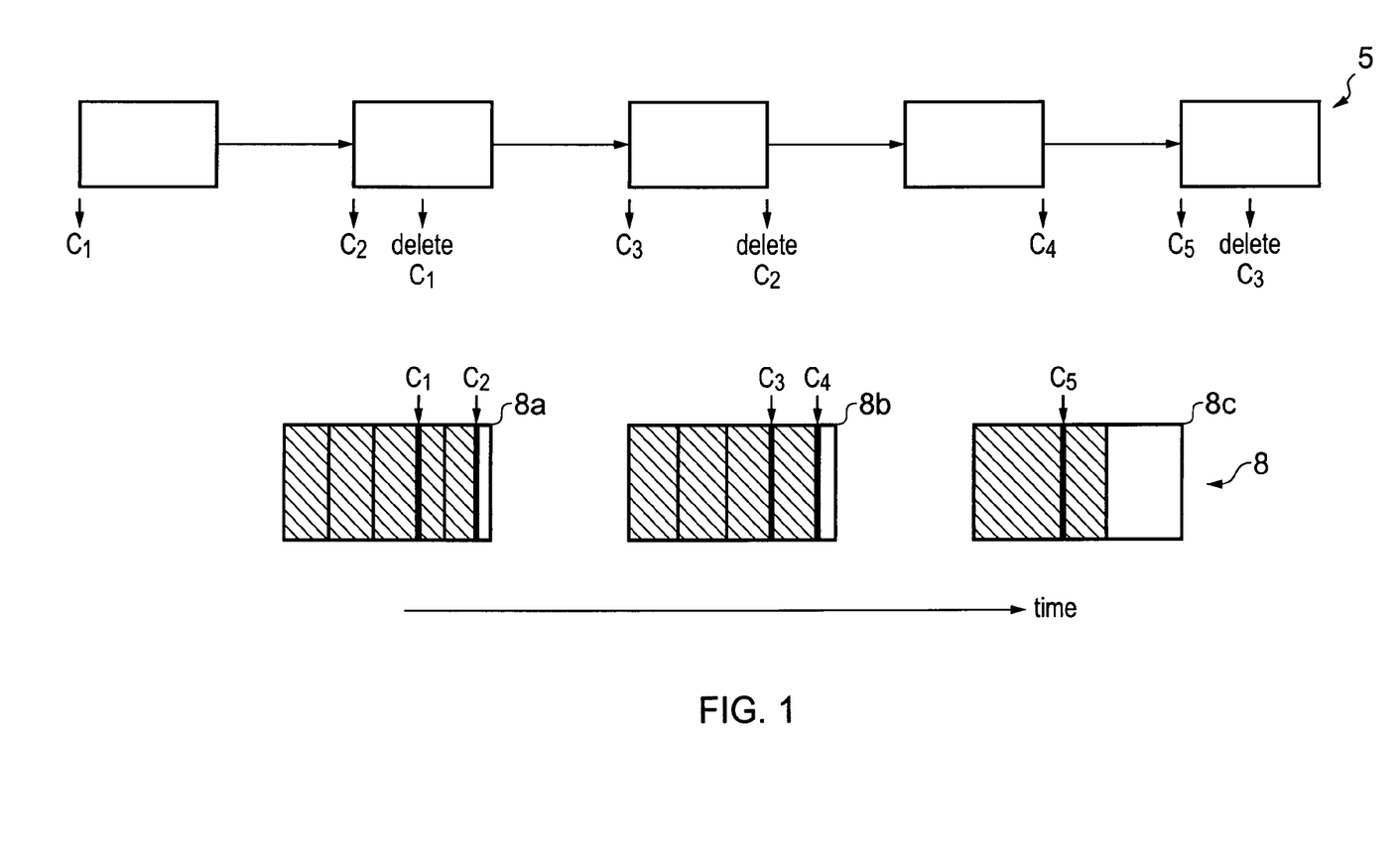
FIG. 1 schematically shows the use of markers in the allocation of portions of memory.

FIG. 1 schematically shows how markers are used to delimit portions of memory that have been allocated. Thus, markers or pins are set as boundaries to regions that have been allocated for use by a process. In this example, portions of memory are allocated as the process executed by the processors requests them and these portions are shown in the Figure with the vertical lines. Thus, pipeline 5 processing a process or application allocates portions of memory within memory blocks 8 as it requires them at various points of execution. It then groups some portions together and sets markers or pins $C_1$ to $C_5$ to mark these grouped portions or regions. The portions that are combined to form regions are selected so that they store data with a similar lifetime, thus the data stored within a region will all go out of date at the same time. The portions of the blocks that are allocated to the process are shown hashed, while those currently not allocated to a particular process are shown not hashed.

Thus, several regions are allocated in block 8a and if it is determined that the data the regions store will go out of date at about the same time they are grouped together and when more data is to be stored in the block that is to be in a different group a marker C1 is set to indicate a new allocated region which will store data which may go out of date at a different time. A further region is then allocated (shown by the vertical line) and then a further region, both regions stored data that will go out of date at about the same time and a new marker is therefore set C2.

When a new region is required to be allocated this is not available in block 8a, so a memory region in a new block 8b is allocated and again as can be seen by the vertical lines several (in this case three) regions are allocated before a new marker C3 is set to indicate a new region. Deletion of the oldest marker indicates that everything older than the eldest surviving marker is deallocated. With reference to FIG. 1 assuming C1 and C2 exist, deletion of marker C1 indicates that everything older than marker C2 (the eldest survivor) is deallocated whether or not those allocations are delimited by markers.

When a marker or pin is set some sort of indication of the time it is set is stored along with the marker. This indication of time needs to be sufficient so that one can always determine which is the oldest pin or marker. Thus, it may be that the pins are simply stored in a list with the oldest pin being at one end of the list and the newest at the other or it may be that some indication of the actual time the pin was set is stored. In effect all that is required is the relative ordering of pins, absolute time is not necessary.

When a group of variables stored within a region is no longer required, the pin marking the start of that group of variables is removed. When the oldest remaining pin is removed the memory between this and the new oldest remaining pin is deallocated as a chunk. In this way rather than tracking deallocations of individual memory units, it is possible to simply delete pins as the region they mark the boundary of is no longer required and to deallocate memory up to the oldest pin. Thus, in FIG. 1 when the oldest pin is removed the new oldest pin marks the start of the allocated region and the region prior to this is deallocated.

Figure 2:
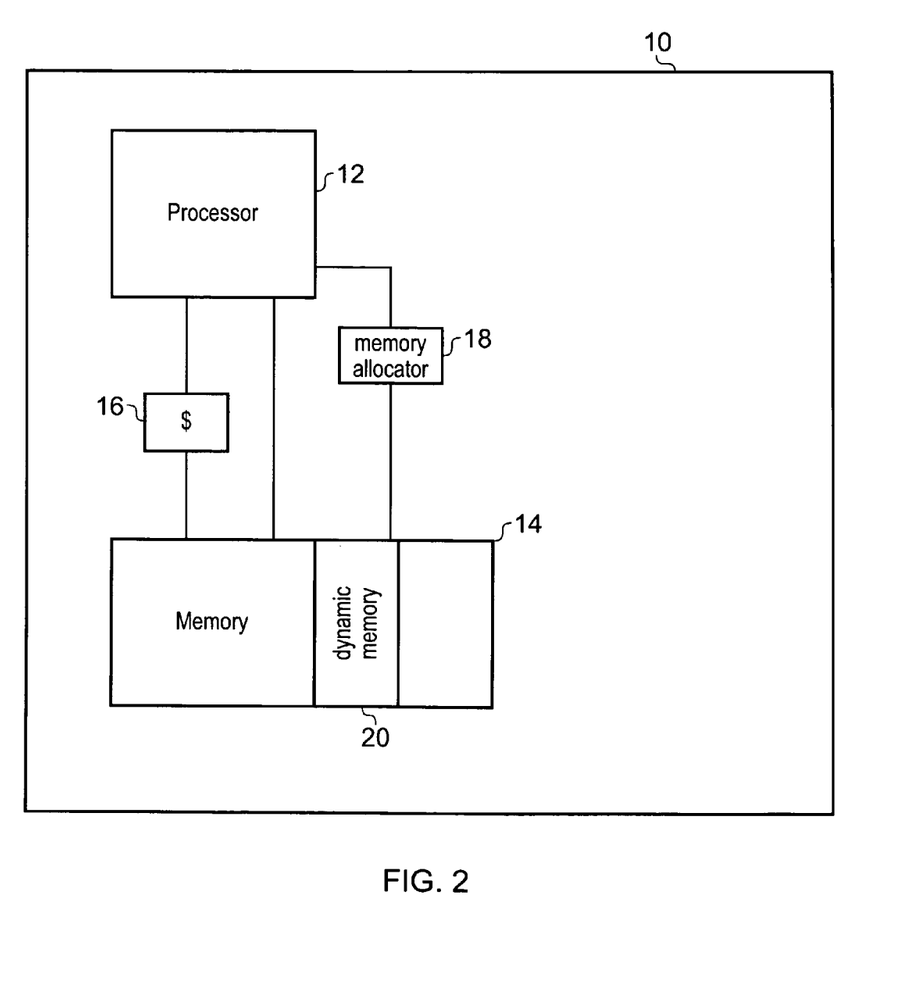
FIG. 2 shows a data processing apparatus according to an embodiment of the present invention.

FIG. 2 shows a data processing apparatus 10 according to an embodiment of the present invention. Data processing apparatus 10 has a processor 12 that accesses data stored in memory 14 and it may have further data storage capacity in a cache 16. Processor 12 in this embodiment has a memory allocator 18 associated with it and this memory allocator controls the allocation of the memory within the dynamic memory region 20 for use by applications or processes running on the processor. There are markers 22 stored within memory 14 and these indicate the regions of the memory that are currently allocated.

Thus, the processor 12 executing an application may request memory storage facilities from memory allocator 18 which will then allocate a block of dynamic memory to the application executing on processor 12. At a certain point when a certain number of portions of memory have been allocated to the application, the application may recognise that the current data that is being stored within the allocated portion of memory is linked in some way and as such should be stored in a single region and it indicates this to memory allocator 18 which sets a marker within memory 14 which indicates the end of a region. This marker is stored within memory 14 and has an indication of the boundary location of this allocated region and an indication of the time the marker was set. It may be stored in a particular portion of memory (not shown) or it may be stored interleaved among the allocations. In the case that large quantities of data separate the markers then it may be advantageous to store the markers in separate regions. When the set of data stored within this region is no longer required, the process will indicate this to memory allocator 18 which will delete the marker marking the start of the region. If the marker deleted is the oldest marker then the region of memory up to the new oldest marker is then deallocated. This process will be shown in more detail later with respect to later figures.

Figure 3:
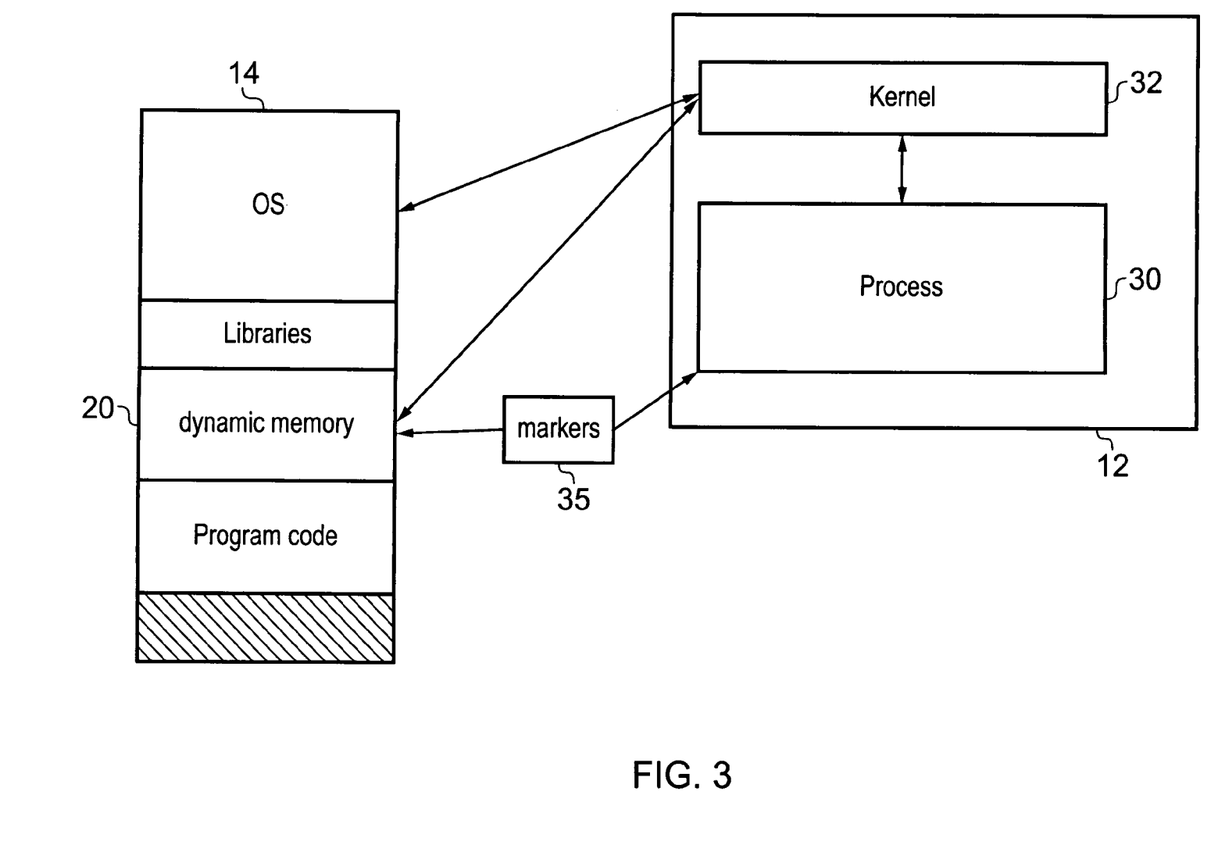
FIG. 3 shows a processor and memory that it uses for storing data that it is processing.

FIG. 3 shows a further example of a processor 12 which stores data within memory 14. In this embodiment the processor 12 has a kernel of an operating system executing upon on it as well as a process. Memory 14 is divided into sections the first section storing the operating system that is executing on the processor 12 further sections storing program code, libraries and a further section 20 being the dynamic memory which can be dynamically allocated and to the processes that are executing as they require storage.

In this embodiment, process 30 executing on processor 12 will request from kernel 32 an area of memory for its use. Kernel 32 controls the memory allocation and therefore provides an area of dynamic memory 20 for process 30. As the process executes it will request portions of the memory to store data and these portions will be allocated to the process within the area provided by the kernel 32. At certain points the process 30 will set markers indicating regions of memory that are allocated. In this embodiment these markers are not stored within memory itself but are stored within a separate data store 35. In other embodiments, the markers may be stored within the memory allocator where it is a hardware unit. In this embodiment, the memory allocator is software running on the processor within the process.

Thus, as the process executes it will allocate portions of dynamic memory within the area provided by kernel 32 for use by the process and as sets of portions relating to similar data are allocated it will set markers indicating regions. These markers will be deleted as the data stored within the regions goes out of date and thus, deallocation of the memory is provided in chunks.

Although, it is shown in this embodiment that memory is dynamically allocated to a process executing within processor 12, in other embodiments at least a portion of the memory allocated to the operating system may also be dynamically allocated by kernel 32. This may be convenient where for example the operating system controls device drivers which become active at certain points and at these points require memory while when they are not active they do not. Thus, in order to make efficient use of memory 14 it may be convenient if the kernel can dynamically allocate memory areas to the operating system.

In such a case, the use of markers and the allocation of the memory within regions also provides an efficient and effective way of allocating and deallocating memory.

Figure 4A:
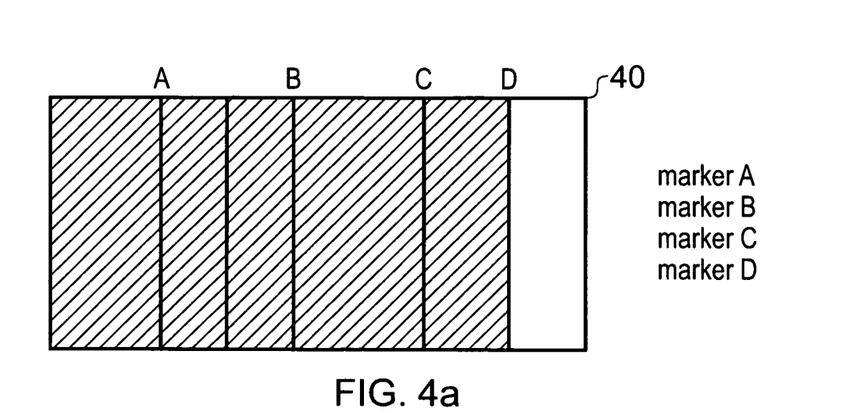
FIGS. 4a to 4c shows how markers are set and deleted.
Figure 4B:
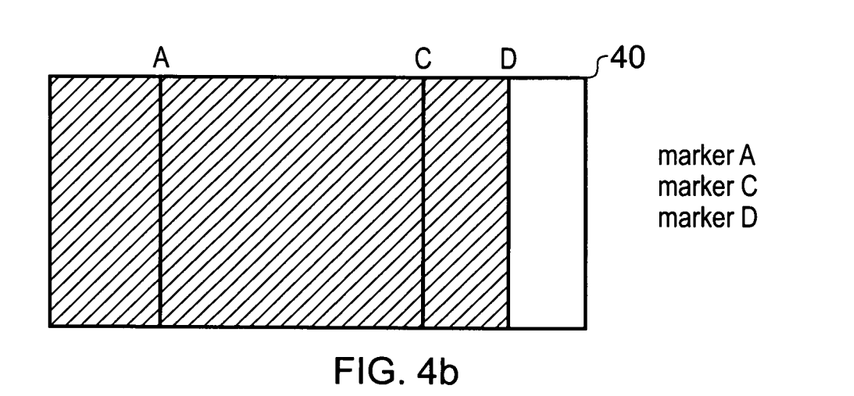
Figure 4C:
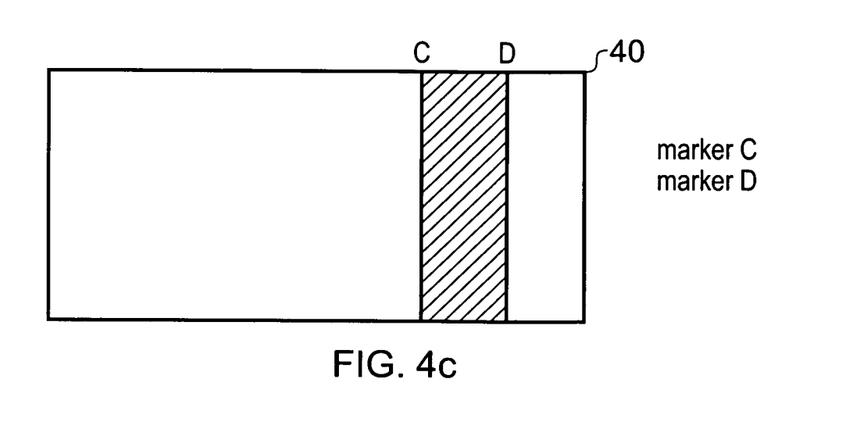

FIGS. 4a to c illustrate how portions of memory are allocated and how markers are set to denote regions and how these markers are deleted as memory is deallocated.

Thus, in this embodiment there is an area of memory shown schematically as 40 which has been provided by the kernel for use by the process. As the process executes it requests portions of memory for allocation and at certain points it will set markers indicating that a region has been allocated. Thus, in this embodiment there is a marker A, a marker B, a marker C and a marker D set within block 40 in FIG. 4a. These markers are in this embodiment stored as a list so that it is clear to the process that marker A is the oldest and marker D is the newest.

During execution, the region between marker B and C stores data which is no longer required and thus, marker B that indicates the start of this region is deleted. However, this marker is not the oldest marker and thus, no memory is deallocated. However, the list of markers now stores marker A, marker C and marker D.

FIG. 4C shows what occurs when the data stored in the region bounded by marker A is no longer required. At this point, marker A is deleted and as this is the oldest marker the region older than the new oldest marker, marker C is deallocated. In this way, memory is allocated and deallocated in blocks of memory by the simple storing or deletion of a marker.

Figure 5:
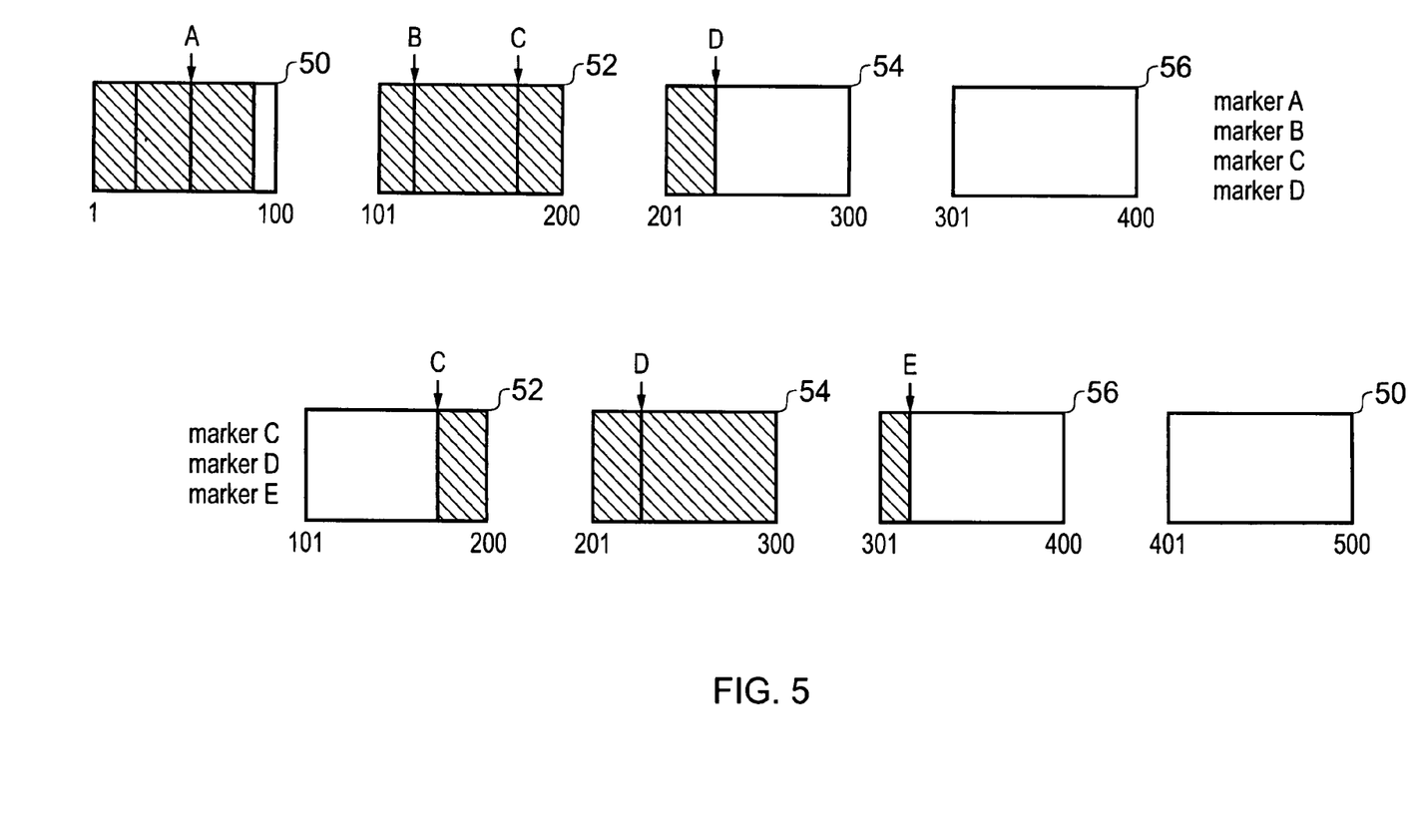
FIG. 5 shows the allocation of memory within blocks of memory.

FIG. 5 shows an alternative embodiment where rather than an area of memory being provided by the kernel, blocks of memory are provided. Thus, in this embodiment there are blocks of memory 50, 52, 54 and 56 that are provided by the kernel for use by the process. During execution of the process portions of memory are requested and are stored within the blocks and at certain point markers are set. If a portion is too big to store within a current block then it is stored in the next block with the unused portion is ignored. The blocks are treated as being consecutive to each other and thus, first block 50 is filled, then block 52, then block 54. Markers are set to delimit regions of memory and as data within regions of memory goes out of date and is no longer required then the marker at the start of the region is deleted. Thus, in the first instance marker A, marker B, marker C and marker D are set and block 50, 52 and 54 are sequentially arranged. When marker A is deleted then block 50 no longer contains any allocated memory and thus, this block is free to be allocated again and is moved to the end of the list. Marker B is also deleted at this time, but as marker C is set block 52 is still required. In the meantime marker E has been set and block 56 is now within the sequential list, while area 50 is now arranged ready, to join this sequential list when new portions of memory are allocated.

This is a convenient way of controlling the memory allocation. Furthermore, when requesting memory from the kernel, memory may be requested as individual blocks or as a set of discontiguous blocks. This depends on whether the resources required by the process are known in advance or not. Furthermore, if one knows the largest portion that the process will allocate at any one time then this can set the size of the block, either as this size or as a multiple of this size. As a partial portion can not be allocated within a block this is an efficient way of providing memory for allocation to the process provided that such wastage can be tolerated, which is more likely where such memory is ephemeral. If the maximum size of the portion is not known then when the process requires a portion of memory that is larger than a block that is available a block of that size will be requested from the kernel.

It should be noted that in some embodiments the size of the blocks that are allocated may be changed during processing in dependence upon the size of memory allocations currently required and to address peak-demand situations.

For example, a situation may arise where single allocations are 100 megabytes in size—thus forcing the blocks allocated from the kernel to be some integer multiple of that size (let's say the multiple is 8). There may be many such allocations. Later in the 'life' of that application, the per-allocation requirement may fall to 1 megabyte. This may occur in the case of a 3D 'camera' where it moves from a complex outdoor environment to a much simpler indoor one.

In this scenario the allocator will have unused blocks, each sized at 800 megabytes (and thus 800 times bigger than required for the prevailing conditions). Even if all unused blocks are returned to the kernel, the 'current' block is still 100 times bigger than we'd like it to be (because the 'ideal' multiple was chosen as 8). If this situation arises we may choose (either when the current block is exhausted, or before) a smaller size for the next block.

This is highly application dependent: an application which has a low allocation min:max ratio (i.e. doesn't really exhibit peak-demand behaviour) may choose a single block size, whereas one which has a higher ratio may need to adjust the block sizes over time (to avoid starving other programs executing on the same processor).

One process where embodiments of the present invention are particularly effective is in graphics processing. In graphics processing sets of data for a frame to be displayed are processed together and then go out of date together. In this way, allocation of memory in regions with the setting and deletion of markers is an effective and efficient way of controlling memory allocation.

Figure 6:
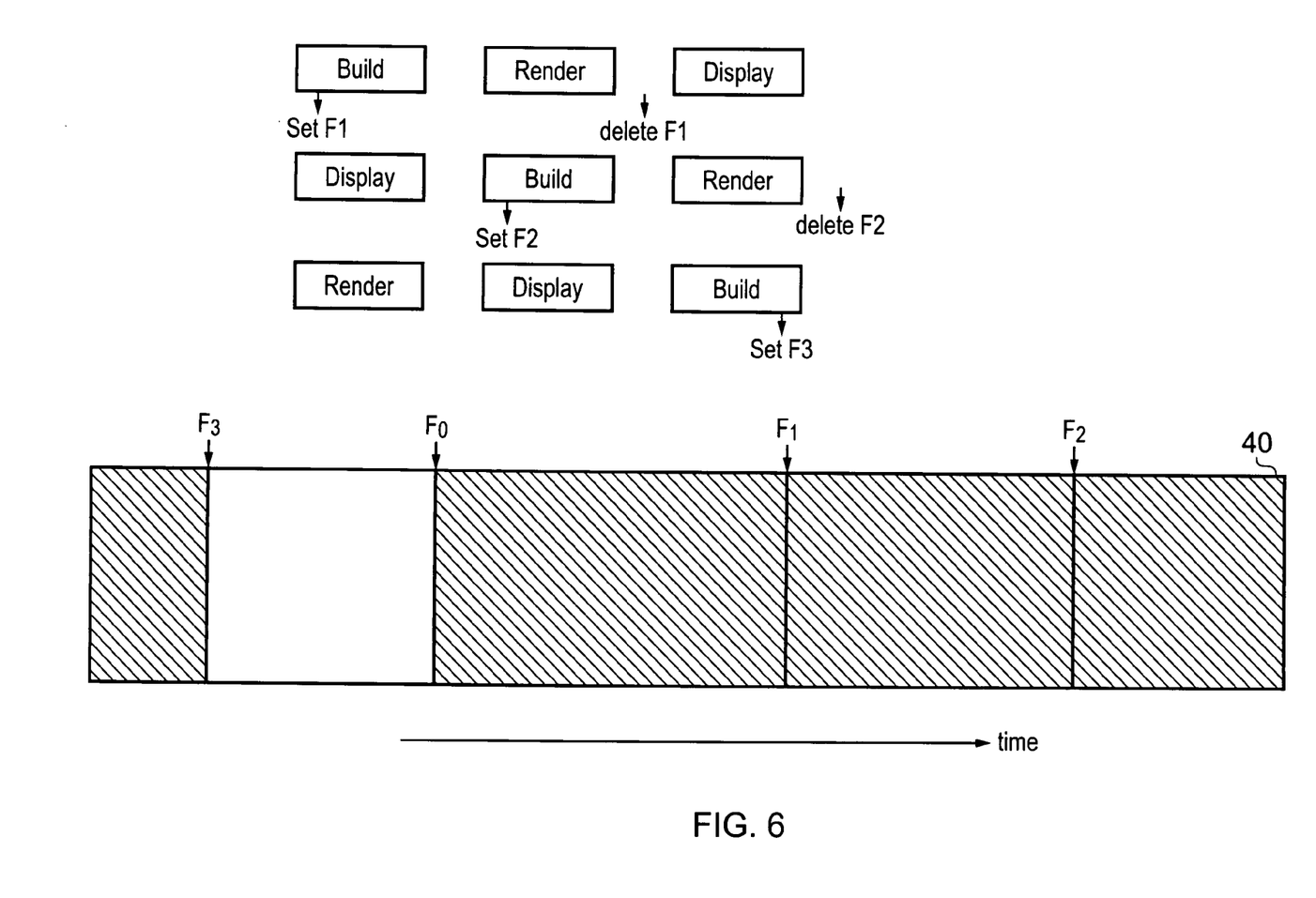
FIG. 6 shows the allocation of memory for a graphics processing unit pipeline.

FIG. 6 shows schematically a graphics pipeline wherein sets of data are built rendered and prepared ready for display in parallel to each other. Each row shows the process pipeline for displaying a single video-frame of an animated display. Each column represents a time interval. It therefore shows how several frames occupy different processing stages at the same time. Thus, during the build phase data is received for a particular frame and a portion of memory is allocated and a marker is set delimiting the region. Once the data has been rendered and is ready for display, this may be in the form of pixels or it may be in the form of intermediate graphical data the initial data is no longer required and thus, the marker that was set at the start of the region can be deleted. Thus, in FIG. 6 one can see that a marker is set during the build phase and is deleted after the render phase. The area of memory 40 that has been provided by the kernel is used a little like a ring buffer in that regions of memory are allocated and markers set and when allocating portions once one reaches the end of the area one starts again at the beginning. Provided one is aware of the oldest and newest markers one knows where to allocate and where to deallocate. It is different from a ring buffer in that it is not of a fixed size and that groups of allocations are tracked rather than individual allocations as in a ring buffer. Furthermore the blocks in the ring buffer need not remain in a fixed sequence where, the block sizes are not uniform.

Figure 7:
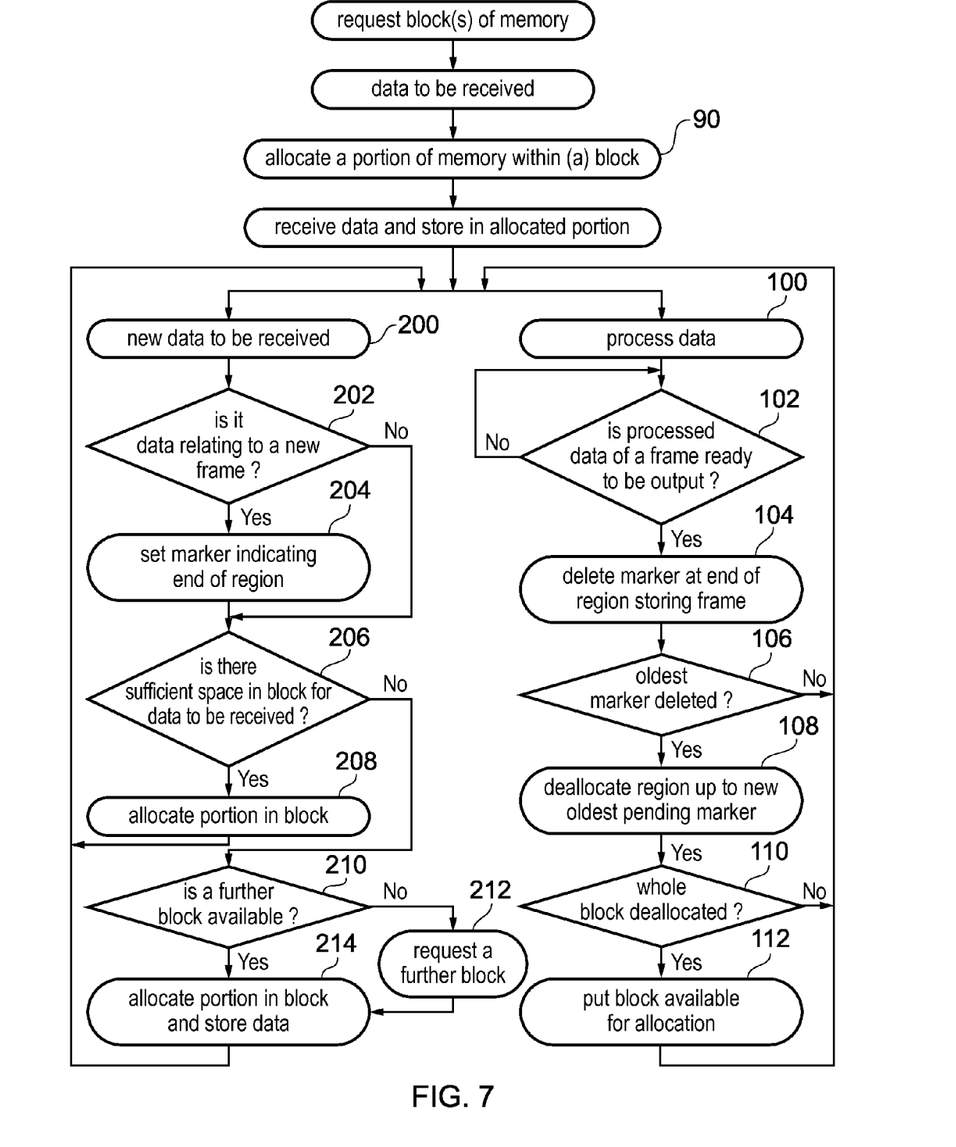
FIG. 7 shows a flow diagram illustrating a method according to an embodiment of the present invention.

FIG. 7 shows a flow diagram illustrating steps in a method according to an embodiment to the present invention. When memory is allocated (90) using this technique, it may be done by a hardware memory allocator or it may be done by software that is part of the operating system or its libraries or it may be done by software in the application that requires the memory itself.

In the method illustrated here, the memory is requested in blocks as is shown in FIG. 5. In other embodiments, an area of memory will be requested and this will be subdivided with the markers. Thus, in this embodiment one or more blocks of memory is requested from the kernel and the processor then receives an indication that data is to be received. A portion of memory within a block is then allocated for this data and the data is received and stored in the allocated portion. The processor then proceeds to process the data (100) and at some point to receive new data (200). Thus, these two processes are shown as running in parallel to each other.

The steps that occur during the processing of the data are in this embodiment steps that occur during graphics processing. First it is determined (102) if the data stored for a frame has been processed to form data that is now ready to be output so that the originally stored data is no longer required. Once this is the case a marker at the start of the region that stores that frame is deleted (104). It is then determined (106) if this marker is the oldest marker that has been deleted, if it is the oldest marker then the region up to the oldest pending marker is then deallocated (108) while if it isn't it then continues with processing of the data and the receiving of data.

If the region up to the oldest pending marker has been deallocated it is then determined (110) if the whole block has been deallocated if it hasn't one returns to processing and receiving the data if it has that block is available for allocation and is logically arranged as a block for allocation (112) and once a portion is allocated within this block it is logically arranged at an end of the list of sequential blocks.

In parallel to this data is being received and it is then determined (202) if this data relates to a new frame. If it does a marker is set (204) indicating a start of a new region (and an end of an older region), if it doesn't then no marker is set.

It is then determined (206) if there is sufficient space in the block for the data that is to be received, if there is, a portion in the block is allocated (208) and if there isn't it is determined (210) if a further block is available. If a further block is not available then a further block is requested (212) and a portion in the block is then allocated (214) and the data stored. The data to be stored is then processed and the steps for processing data are followed and in parallel to this new data may be received.

It should be noted that when the block(s) of memory are initially requested from the kernel, they may be a single block of the maximum size of a data portion that will need to be allocated or they may be a plurality of such blocks or they may be a single or a plurality of blocks of any size. If these blocks are not large enough to store a particular portion then the step of the method where it determines if there is a further block available and allocates a portion of the block and stores the data, will have an additional step where it determines that no further block of sufficient size is available to store the portion and a block is requested from the memory which is large enough to store the portion.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

I claim:

1. A method of allocating regions of memory for use by a process comprising the steps of:

in response to a plurality of requests for data storage from a process, allocating a corresponding plurality of portions of memory for use by said process;

marking regions of memory that are allocated with markers, said markers indicating a location of a boundary of an allocated region of memory and a relative time said marker was set with respect to other markers, each of said regions comprising at least one of said plurality of portions; wherein a start of a region is marked with one of said markers and an end of a region is marked with a further one of said markers, said further one of said markers having a later relative time indication than said one of said markers indicating that said later relative time marker is a more recently set marker, and a next allocated region is marked by said further one of said markers and a yet further one of said markers, said yet further one of said markers having a yet later relative time indication; and in response to determining that a region of allocated memory bounded by two of said markers is no longer required by said process, deleting an older of said two markers;

in response to detecting deletion of an oldest one of said markers, deallocating said region of memory up to a new oldest pending marker, said above steps are implemented on a data processor.

2. A method of allocating regions of memory according to claim 1, wherein each of said regions comprise at least one of said plurality of portions.

3. A method of allocating regions of memory according to claim 1, wherein an end of said region marked by said further marker abuts a non-allocated region of memory when said further marker is set.

4. A method of allocating regions of memory according to claim 1, wherein said steps of allocating and deallocating memory treat said memory as being subdivided into a plurality of blocks, at least some of said plurality of blocks that have portions allocated to said process being arranged in a logical sequential series such that memory regions are allocated within said blocks in an order of said sequential series, a region being allocated in a first block before a region is allocated in a second block, and wherein in response to all of a memory region within a block being deallocated said block is logically removed from said series such that on further allocation by said allocation step said block can be arranged logically at an end of said sequential series of blocks.

5. A method of allocating memory according to claim 4, wherein said memory is memory within a data processing apparatus, said data processing apparatus further comprising a processor and wherein allocation of said memory within said data processing apparatus is controlled by a kernel of an operating system executing on said processor, said method further comprising a step of:

requesting at least one block of memory to be available for allocation to said process, a size of said block of memory requested being equal to a multiple of a maximum size of one of said plurality of portions requested by said process; and wherein said steps of allocating said plurality of portions of said memory comprising allocating portions within said at least one block.

6. A method of allocating memory according to claim 4, wherein said memory is memory within a data processing apparatus, said data processing apparatus further comprising a processor and wherein allocation of said memory within said data processing apparatus is controlled by a kernel of an operating system executing on said processor, said method further comprising a step of:

requesting at least one block of memory to be available for allocation to said process; and in response to said process requesting data storage that is larger than said at least one block requesting a further block of memory that is large enough for said data storage and allocating said further block of memory to said process.

7. A method of allocating memory according to claim 1, wherein said memory is memory within a data processing apparatus, said data processing apparatus further comprising a processor and wherein allocation of said memory within said data processing apparatus is controlled by a kernel of an operating system executing on said processor, said method comprising a further step of:

said process requesting from said kernel an area of memory for allocation by said process;

said steps of allocating said plurality of portions of said memory comprising allocating portions within said area.

8. A method according to claim 7, said method comprising a further step of:

in response to at least one region of said memory being deallocated indicating to said kernel that said at least one region is available for allocation.

9. A method according to claim 7, said method comprising a further step of:

in response to at least one region of said memory being deallocated making said at least one region available for allocation by said process.

10. A method according to claim 7, wherein said process comprises a software process executing on said processor and said allocation steps are performed by said software process.

11. A method according to claim 1, wherein said process comprises a process that periodically processes one of a plurality of sets of input data to generate a corresponding plurality of sets of resultant data, said markers being placed to delimit regions of said memory storing said sets of input data currently being processed, and said step of deleting an older of two markers bounding a region being performed in response to said process generating a set of resultant data from a corresponding set of input data stored within said region.

12. A method according to claim 11, wherein said process comprises a graphics process and each set of resultant data comprises data for displaying a frame, said step of deleting said marker being performed following rendering of said input data to generate said resultant data.

13. A computer program product stored on a non-transitory computer readable storage medium and including a computer program which, when executed by a processor, controls said processor to perform a method according to claim 1.

14. A data processing apparatus comprising:
a processor for processing data
a memory for storing data processed by said processor;
a memory allocator for allocating and deallocating regions of memory for use by a process being performed by said processor; and
a storage region for storing markers, each marker comprising an indication of a location of a boundary of an allocated region of memory and an indication of a relative time said marker was set with respect to other markers; wherein
said memory allocator is configured in response to requests for data storage from said process:
to allocate portions of memory for use by said process; and
to mark regions of said memory as said regions are allocated to said process by setting said markers; wherein a start of a region is marked with an earlier marker and an end of a region is marked with a further marker, said further marker having a later relative time indication than said earlier marker indicating that said later relative time marker is a more recently set marker, a next allocated region being marked by said further marker and a yet further marker, said yet further marker having a yet later relative time indication; and
said memory allocator is configured in response to determining that a region of allocated memory bounded by two of said markers is no longer required by said process to delete an older of said two markers and when deleting an oldest of said markers to deallocate said region of memory up to a new oldest pending marker.

15. A data processing apparatus according to claim 14, wherein an end of said memory allocator is configured to set a marker marking an end of a region at a location abutting a currently non-allocated region.

16. A data processing apparatus according to claim 14, wherein said memory allocator is configured to treat said memory as being subdivided into a plurality of blocks, said plurality of blocks being arranged in a logical sequential series such that memory regions are allocated within said blocks in an order of said sequential series, a region being allocated in a first block before a region is allocated in a second block, said memory allocator being configured in response to all of a memory region within a block being deallocated to logically remove said block to an end of said sequential series of blocks for future allocation by said memory allocator.

17. A data processing apparatus according to claim 15, wherein said processor is configured to process data under control of an operating system and allocation of said memory within said data processing apparatus is controlled by a kernel of said operating system, said memory allocator being configured to request at least one of said blocks of memory to be available for allocation to said process, a size of said block of memory requested being equal to a multiple of a maximum size of one of said plurality of portions requested by said process.

18. A data processing apparatus according to claim 16, wherein said processor is configured to process data under control of an operating system and allocation of said memory within said data processing apparatus is controlled by a kernel of said operating system, said memory allocator being responsive to said process requesting data storage that is larger than said at least one available block to request a further block of memory that is large enough for said data storage.

19. A data processing apparatus according to claim 14, wherein said processor is configured to process data under control of an operating system and allocation of said memory within said data processing apparatus is controlled by a kernel of said operating system, said memory allocator being configured to request an area of memory for allocation from said kernel and being configured to allocate said portions for use by said process within said area.

20. A data processing apparatus according to claim 19, said memory allocator being configured in response to at least one region of said memory being deallocated to indicate to said kernel that said at least one region is available for allocation.

21. A data processing apparatus according to claim 19, said memory allocator being configured in response to at least one region of said memory being deallocated to make said at least one region available for allocation by said process.

22. A data processing apparatus according to claim 19, wherein said process comprises an application process executing on said processor.

23. A data processing apparatus according to claim 14, wherein said processor comprises a graphics processor and said process periodically processes a plurality of sets of input data to generate a corresponding plurality of frames of data for display, said memory allocator being configured to place said markers to delimit regions of said memory allocated to store individual sets of said input data currently being processed, and to delete an older of two markers bounding one of said regions in response to said process generating a set of display data from said set of input data stored within said one of said regions.

24. A data processing apparatus according to claim 14, wherein said marker storage region is within said memory.

25. A data processing apparatus according to claim 14, wherein said storage region is configured to store said markers as a list of markers, a location in said list being indicative of a time said marker was set with respect to other markers in said list.

26. A data processing apparatus comprising:
processor means for processing data
memory means for storing data processed by said processor means;
memory allocator means for allocating and deallocating regions of said memory means for use by a process being performed by said processor means; and
storage region means for storing markers, each marker comprising an indication of a location of a boundary of an allocated region of memory means and an indication of a relative time said marker was set with respect to other markers; wherein
said memory allocator means is configured in response to requests for data storage from said process:
to allocate portions of memory for use by said process; and
to mark regions of said memory means as said regions are allocated to said process by setting said markers; wherein a start of a region is marked with an earlier marker and an end of a region is marked with a further marker, said further marker having a later relative time indication than said earlier marker indicating that said later relative time marker is a more recently set marker, a next allocated region being marked by said further marker and a yet further marker, said yet further marker having a yet later relative time indication; and
said memory allocator means is configured, in response to determining that a region of allocated memory bounded by two of said markers is no longer required by said process, to delete an older of said two markers and when deleting an oldest of said markers to deallocate said region of said memory means up to a new oldest pending marker.

* * * * *